April 1, 1947.  H. W. WIENCKE  2,418,442
MULTICELL FLAT TYPE DRY BATTERY
Filed June 23, 1945
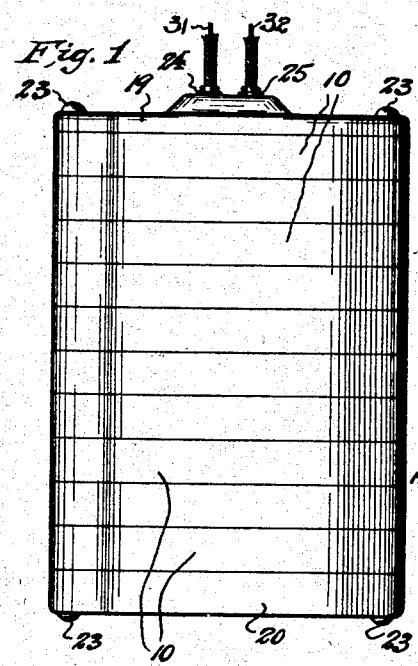
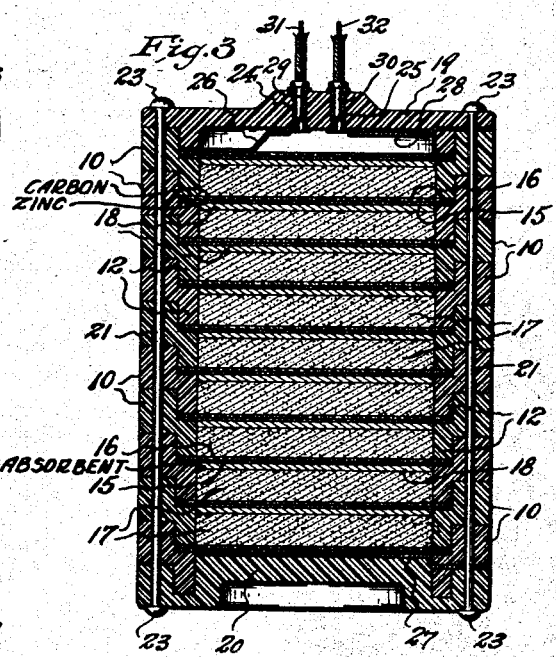
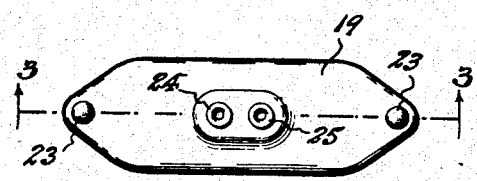
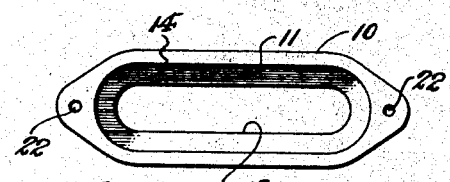
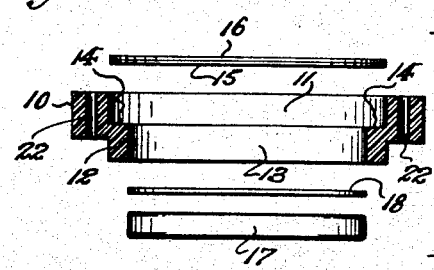
INVENTOR.
Herman W. Wiencke,
BY George D. Richards
Attorney Patented Apr. 1, 1947

2,418,442

UNITED STATES PATENT OFFICE 2,418,442

MULTICELL FLAT TYPE DRY BATTERY

Herman W. Wiencke, Flushing, N. Y., assignor to Hearing Aid Battery Corp., Newark, N. J., a corporation of New Jersey Application June 23, 1945, Serial No. 601,260

1 Claim. (Cl. 136—111)

This invention relates to improvements in electrical dry batteries; and the invention has reference, more particularly, to a novel construction of multicell dry battery of the series connected type.

This invention has for an object to provide a multicell dry battery of the series connected type which is of compact form and structure, wherein the battery units are so related that, when assembled together, they will automatically connect themselves electrically in series relation without necessity for use of interconnecting wiring or similar conductors, and wherein each battery unit comprises an individual cell within which the chemical elements thereof are hermetically sealed both against atmosphere and moisture, as well as against escape or interchange between adjoining cells.

The invention has for another object to provide a multicell dry battery characterized as above set forth, wherein each battery unit is assembled in a novel housing or container member, said housing or container members being so formed as to telescopically interlock one with another in succession, and wherein the assembly includes a duplex electrode means intermediate adjacent units, which also serves as a dividing partition adapted to seal off said units against interchange of their electrolyte content.

The invention has for a further object to provide a novel compact and leakproof multicell dry battery structure which can be economically produced, especially in small sizes suitable for use in portable equipment, such as hearing aid apparatus, field telephones, portable radios and the like.

Other objects of this invention, not at this time more particularly enumerated, will be understood from the following detailed description of the same.

An illustrative embodiment of this invention is shown in the accompanying drawings, in which—

Fig. 1 is an elevational view of a multicell dry battery made according to this invention; Fig. 2 is a top end elevational view of the same; Fig. 3 is a vertical longitudinal sectional view of the same, taken on line 3—3 in Fig. 2; Fig. 4 is a plan view of one of the housing or container members of the battery structure; and Fig. 5 is a cross sectional view of one of said housing or container members, showing the battery unit elements disassembled therefrom, said elements being shown in elevation.

Similar characters of reference are employed in the above described views, to indicate corresponding parts.

Referring to the drawings, the novel multicell dry battery according to this invention comprises an assembly of a plurality of battery units, the number of which may be varied in accordance with the total voltage desired to be obtained. Each unit comprises a housing or container member of suitable peripheral shape, and of suitable length, width and height dimensions; the same being made from a material, preferably a moldable plastic material, of a kind which is both electrically non-conductive and inert to the chemical content of a battery unit to be housed therein; an example of suitable plastic material having such characteristics comprises a polystyrene resin, but it will be obvious that there are other synthetic resin plastics and other kinds of plastic materials which would provide said characteristics.

Each housing or container member comprises a body section 10, having an outwardly open chamber 11, and an integral axially extending neck section 12 of reduced dimensions. The external peripheral shape and length and width dimensions of said neck section 12 correspond to the internal peripheral shape and length and width dimensions of said body section chamber 11. Said neck section 12 is provided with an outwardly open chamber 13 which communicates with the body section chamber 11. Said chamber 13 is of less length and width dimensions than those of the body section chamber 11, thus providing, at the bottom of and extending around the interior of the latter, a seating ledge 14 coincident with the communicating juncture of said chambers.

Supported on the seating ledge 14 within the body section chamber 11 of each housing member, so as to form a separating partition between said chambers 11 and 13 thereof, is a duplex electrode member comprising a sheet of metallic zinc 15 coated on a face thereof exposed toward said body section chamber 11 with a layer of carbon 16; the zinc and carbon materials being thus engaged face to face in electrically conductive contact. Preferably said zinc sheet 15 is adhered and sealed to the surface of said seating ledge 14 by a suitable cement which is inert to the chemical constituents of battery units, whereby to form, at its juncture with said seating ledge 14, a leakproof joint. The zinc sheet 15 is exposed toward the interior of said chamber 13, and said chamber provides a battery unit compartment or cell, bounded at one side by said zinc sheet 15, whereby the latter forms the anode electrode of the battery unit contained within said compartment or cell. Entered in and suitably secured within said compartment or cell 13 is a depolarizer pack 17 formed from suitable constituents and charged with a suitable electrolyte in manner well known to the art. Interposed between said depolarizer pack 17 and said zinc anode electrode 15 is a separator member 18, which may comprise any suitable material which is permeable by the electrolyte content of the depolarizer pack 17, such, e. g., as paper, starch, or other liquid permeable material.

When battery units comprising housing or container members and battery unit forming elements contained in the cell thereof are to be operatively assembled together, the neck section 12 of one housing or container member is inserted and telescoped into the outwardly open body section chamber 11 of an adjoining housing or container member, until opposed faces of said members engage in meeting relation. When the battery units are thus assembled, the depolarizer pack 17 in the cell 13 of one housing or container member will be brought into operative contact with the carbon layer 16 of the duplex electrode member of another or receiving housing or container member, whereby said carbon layer will provide the cathode electrode of and will thus complete the enclosed battery unit.

It will be obvious that any number of thus provided battery units may be assembled in succession to provide a complete multicell dry battery of desired total voltage. For example, assuming the battery units are designed to each yield a voltage output of 1½ volts, if (as shown) nine units are thus assembled in series connected relation, a multicell battery of 13½ volts output will be provided. It will be understood that a duplex electrode member, as disposed intermediate adjoining battery units, will function to provide the zinc anode 15 of one unit in electrically conductive contact with the carbon cathode 16 of the adjoining unit, so that said units are directly electrically connected in series without necessity for provision of interconnecting wiring or other current transfer conducting means, and consequently a very compact, simple, and easily and economically produced multicell dry battery structure is furnished.

To complete the multicell battery as formed by the assembled housing or container members and their contained battery unit forming elements, suitably shaped cover plates 19 and 20 are respectively engaged with and over the end units, whereupon said units and end plates may be suitably secured together against separative displacement. A satisfactory means for so securing these parts together (as shown) comprises tie-bolts 21 which are passed through aligned openings 22 with which the end portions of the body sections 10 of the housing or container members and the end portions of said cover plates are provided, the external extremities of said tie-bolts being headed over upon the external faces of said cover plates, to provide retaining heads 23, or any other suitable fastening means may be substituted for said heads 23. If desired, the meeting faces of the housing or container members and cover plates may be cemented together by a suitable cement which is inert to the chemical constituents of the battery units, whereby to assure tight leakproof joints therebetween.

One said cover plate, as, e. g., the cover plate 19, is provided with suitable battery terminal means with which the terminal poles of the series connected battery units are connected. An illustrative embodiment of such battery terminal means (as shown) comprises outwardly open, spaced apart metallic plug socket elements 24 and 25 which are molded into the body of said cover plate 19. Connected between the duplex electrode of the adjacent battery unit and the inner end of one of the plug socket elements, as, e. g., the element 24, is a suitable conductive lead 26. This lead 26 connects the zinc anode 15 of said duplex electrode with said element 24, the carbon layer 16, if interposed, merely acting as a conductor between said zinc anode and said lead 26. The battery unit at the opposite end of the series is connected by a suitable conductive lead 27 with a tie bolt 21. This lead 27 connects the carbon cathode 16 of the last duplex electrode with said tie-bolt 21, the zinc layer 15, if interposed, merely acting as a conductor between said carbon cathode and said lead 27. From the opposite end of the tie-bolt 21 extends a lead 28 which is connected with the remaining plug socket terminal 25. It will thus be obvious that the units of the multicell battery are connected in series between said outlets formed by the plug socket elements 24 and 25. Said plug socket elements 24 and 25 may respectively detachably receive connection therewith of plug terminals 29 and 30 of the respective conductors 31 and 32 of an electrical circuit desired to be served by the multicell battery.

I am aware that various changes could be made in the above described constructions without departing from the scope of this invention as defined by the following claim. It is therefore intended that all matter contained in the foregoing description or shown in the accompanying drawings shall be interpreted as illustrative and not in a limiting sense.

I claim:

A multicell dry battery comprising a plurality of self series connecting battery units, each unit comprising a container member made of material which is both electrically non-conductive an inert to the chemical constituents of battery elements, said container members each comprising a body section and a neck section of reduced external and internal dimensions in order to provide the same respectively with outwardly open communicating chambers and an internal seating ledge coincident with the juncture thereof, a duplex electrode of plate-like form comprising an anode layer and a cathode layer in conductive contact, said duplex electrode being seated on and sealed to said seating ledge within and across the body section chamber, a depolarizer pack lodged within the neck section chamber, the neck section of one container member being telescopically received in the body section chamber of an adjoining container member, whereby a depolarizer pack is operatively disposed between an anode layer of a duplex electrode of one container member and the cathode layer of a duplex electrode of an adjoining container member, a cover plate for each end of the container member assembly, tie-bolts extending through the aligned end portions of said container members and cover plates, a pair of battery terminal outlet means carried by one of said cover plates, a conductive lead extending between one pole of the series connected battery units directly to one of said terminal outlet means, a conductive lead extending between the other pole of the series connected battery units to the adjacent end portion of one of said tie-bolts, and a conductive lead extending from the opposite end portion of said latter tie-bolt to the other of said terminal outlet means.

HERMAN W. WIENCKE.

REFERENCES CITED

The following references are of record in the file of this patent:

UNITED STATES PATENTS

| Number | Name | Date |
|---|---|---|
| 650,886 | Wiegand | June 5, 1900 |
| 2,040,255 | Gordon | May 12, 1936 |
| 2,225,460 | Porth | Dec. 17, 1940 |
| 2,375,875 | Sanderson | May 15, 1945 |

FOREIGN PATENTS

| Number | Country | Date |
|---|---|---|
| 49 | British | 1891 |